United States Patent [19]

Nattel

[11] Patent Number: 4,529,834
[45] Date of Patent: Jul. 16, 1985

[54] FORMED METALLIC WIRING BOX

[75] Inventor: William Nattel, Montreal, Canada

[73] Assignee: Commander Electrical Materials, Inc., Saint-Jean-sur-Richelieu, Canada

[21] Appl. No.: 494,832

[22] Filed: May 16, 1983

[51] Int. Cl.³ .............................................. H02G 3/08
[52] U.S. Cl. ...................................... 174/53; 220/3.2; 411/437
[58] Field of Search .............................. 174/53, 65 R; 220/3.2–3.94; 411/437

[56] References Cited

U.S. PATENT DOCUMENTS

| | | | |
|---|---|---|---|
| 2,364,668 | 12/1944 | Simmons | 411/437 |
| 2,775,916 | 1/1957 | Baxter et al. | |
| 3,575,313 | 4/1971 | Trachtenberg | 220/3.3 |
| 3,876,821 | 4/1975 | Pringle | 174/53 |
| 3,955,463 | 5/1976 | Hoehn | |
| 4,012,580 | 3/1977 | Arnold | 174/53 |
| 4,036,389 | 7/1977 | Pate et al. | 220/3.8 |
| 4,071,159 | 1/1978 | Robinson et al. | 220/3.2 |
| 4,105,862 | 8/1978 | Hoehn | 174/53 |
| 4,109,693 | 8/1978 | Paskert | |
| 4,143,696 | 3/1979 | Holton et al. | |
| 4,167,648 | 9/1979 | Lockwood | 174/53 |
| 4,188,854 | 2/1980 | Hoehn | |
| 4,214,667 | 7/1980 | Lass | 220/3.2 |
| 4,281,773 | 8/1981 | Mengeu | 220/3.2 |
| 4,311,422 | 1/1982 | Jackovitz | 411/112 |
| 4,316,999 | 2/1982 | Nattel | 174/65 R |

Primary Examiner—A. T. Grimley
Assistant Examiner—D. A. Tone
Attorney, Agent, or Firm—Larson and Taylor

[57] ABSTRACT

Formed metal electrical wiring boxes possess integral wiring device mounting members which permit the facile push-insertion of the wiring device mounting screws, but which firmly engage the mounting screws once tightened down. The mounting members comprise a flat portion attached to each endwall of the wiring box and formed at right angles to the endwalls. Opposed leg portions are attached to the flat portion, and are folded downwardly along the box endwalls. The leg portions terminate in opposed foot portions spaced apart from one another by a distance less than the diameter of the wiring device mounting screw. A mounting screw inserted through an aperture in the flat portion and between the opposed leg portions contacts the opposed foot portions forcing the leg portions apart to permit the push-insertion of the screw. Turning the mounting screw draws the opposed foot portions upward, forcing them against the screw threads to firmly egage the screw.

3 Claims, 4 Drawing Figures

FORMED METALLIC WIRING BOX

CROSS-REFERENCE TO RELATED APPLICATIONS

This application discloses and claims subject matter related to co-pending application Ser. No. 494,849 filed concurrently herewith by the same inventor and assigned to the assignee of the present invention.

BACKGROUND OF THE INVENTION

This invention relates to electrical wiring box structures. More particularly, it is concerned with a formed metallic electrical wiring device having integral wiring device mounting means.

Numerous methods have been disclosed in the prior art for attaching the mounting screw of an electrical wiring device to the wall structure of an electrical wiring box. In the case of wiring boxes formed of plastic or other moldable materials, mounting methods have been disclosed which depend either upon a threaded screw opening in the box wall structure or a screw engaging metal insert which mates with the box wall. The former arrangement is not desirable because of the ease with which the threads formed in the plastic box wall become stripped. In the latter arrangement, the provision of a metallic insert adds to the overall cost of the box and the installation time. Many of these schemes provide, however, for the easy push-insertion of the wiring device mounting screw during installation.

In the case of wiring boxes fabricated of metal, it has been the common practice in the trade to simply form threads in the wall structure of the wiring box. In such metal wiring boxes, typically no provision is made for the rapid push-insertion of the wiring device mounting screw, and the mounting screw must be inserted by the time consuming action of turning the full length of the screw into the threaded opening.

SUMMARY OF THE INVENTION

It is therefore an object of the present invention to provide a metallic electrical wiring box having integral mounting means for an electrical wiring device which permits the rapid push-insertion of the device mounting or fastening screw.

It is a further object of this invention to provide a metal electrical wiring box having an integral device mounting means, easily fabricated in one piece by metal stamping and forming operations.

This and other objects, advantages and capabilities are achieved by electrical wiring boxes in accordance with the present invention which comprise a metal wall structure including first and second side wall portions, first and second end wall portions, and a rear wall portion therebetween which form a chamber to receive a wiring device. Each of the first and second endwall portions of the wiring box have wiring device attachment means integral therewith for receiving the mounting screw of a wiring device mounted in the box chamber.

The wiring device attachment means comprise a flat portion bent or formed substantially at right angles to the endwall portion of the wiring box and provided with an aperture to receive the mounting screw of the wiring device. First and second resiliently flexible opposed leg portions are attached to the flat portion, with the leg portions being bent downwardly along the endwall portion of the wall structure.

The first and second leg portions terminate in first and second opposed foot portions adapted to contact the wiring device mounting screw inserted through the screw receiving aperture and passing between the opposed leg portions. The opposed leg portions are adapted to flex apart to permit the facile insertion of the mounting screw between the opposed foot portions, but to urge the opposed foot portions toward one another to engage the mounting screw and prevent its easy removal.

BRIEF DESCRIPTION OF THE DRAWING FIGURES

For a better understanding of the present invention, together with other and further objects, advantages, and capabilities thereof, reference is made to the following specification and appended claims in connection with the above-described drawing figures.

DETAILED DESCRIPTION

Figure 1:
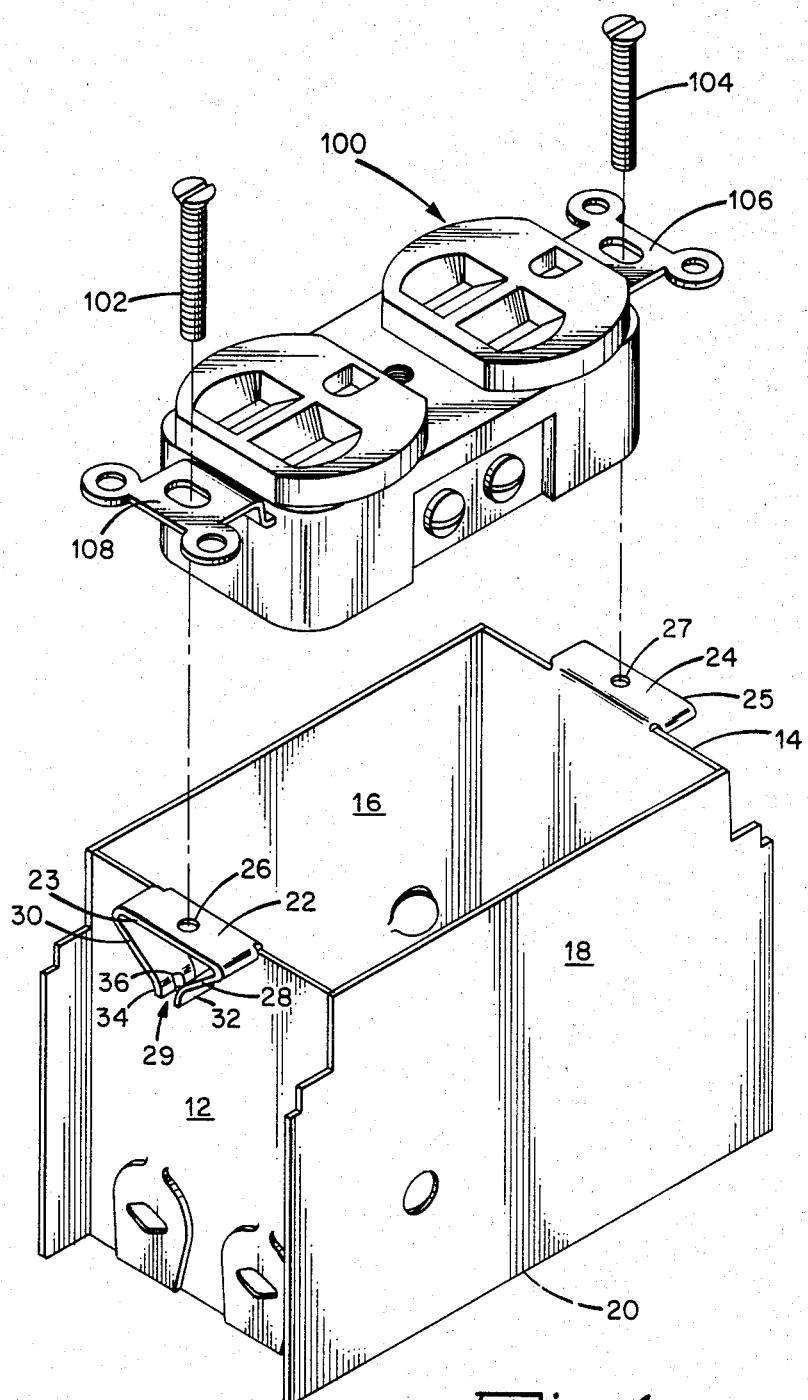
FIG. 1 is an exploded perspective view of a wiring box in accordance with the present invention showing a double outlet device with mounting screws.

Referring to FIG. 1 there is shown an electrical wiring box 10 in accordance with one aspect of the present invention, together with a typical double receptical electrical outlet device 100 with mounting screws 102 and 104.

The wiring box 10 is formed by conventional metal stamping and forming techniques with endwall portions 12 and 14 and sidewall portions 16 and 18. A rear wall 20 connects the side- and endwall portions to form the box structure providing an opening or chamber adapted to receive a wiring device such as double outlet device 100 or a switch device (not shown).

Each endwall portion of the wiring box 10 has a portion for receiving and engaging the mounting screws of the wiring device 100. For example, endwall 12 has a portion 23 integrally formed with the endwall for receiving and engaging mounting screw 102 of the wiring device 100. In a similar manner, endwall 14 of the wiring box 10 has a portion 25 for receiving and engaging mounting screw 104.

The mounting screw engaging portions of the box wall structure have a flat portion, for example 22, bent substantially at right angles to the box endwall, and drilled or punched to provide an opening or aperture 26. The aperture 26 is formed slightly larger than the standard outside diameter of wiring device mounting screws to permit the easy insertion of the screw through the opening 26.

The screw engaging portions of the box endwall have opposed flexible and resilient leg portions 28 and 30 which are integrally attached to the flat portion 22 and are folded downwardly along the endwall 12 of the box 10. The leg portions 28 and 30 terminate in opposed foot portions 32 and 34. In a preferred embodiment of the invention, the inner face of each foot portion is partially threaded to more firmly engage the wiring device mounting screw. For example, as can be seen in FIG. 1, foot portion 34 is partially threaded at 36.

The opposed leg portions 28 and 30 of the screw engaging portions of the box endwall 12 are formed to provide a gap or spacing 29 between the opposed foot portions 32 and 34 which is slightly less than the standard outside diameter of wiring device mounting screws. Insertion of the mounting screw 102 through aperture 26 and between opposed leg portions 28 and 30 thus causes the threads of the mounting screw to contact the opposed foot portions 32 and 34. The opposed leg portions 28 and 30 freely flex or move apart from one another to permit the easy push-insertion of the mounting screw 102. The opposed foot portions 32 and 34 continually contact the mounting screw as it is inserted by pushing, the threaded inner faces 36 of the opposed foot portions 32 and 34 ratcheting along the threads of the mounting screw.

Figure 2:
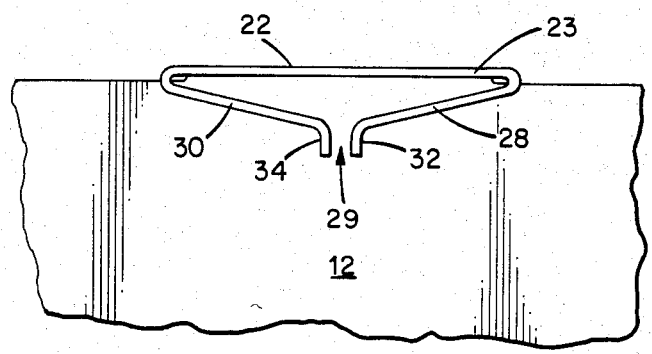
FIG. 2 is a partial end view of the wiring box of FIG. 1, shown prior to insertion of the wiring device mounting screw.
Figure 3:
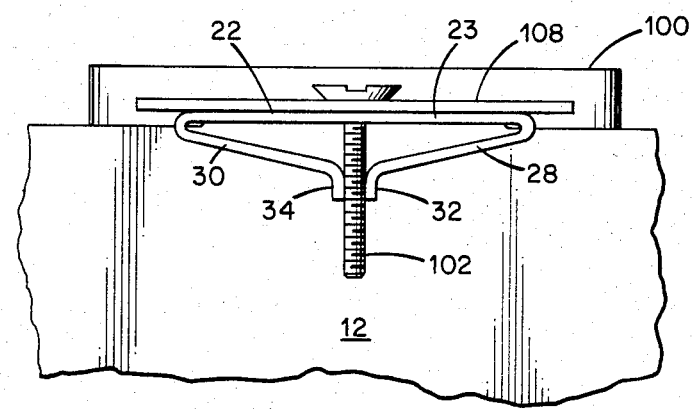
FIG. 3 is a partial end view of the wiring box of FIGS. 1 and 2 shown following the insertion of the wiring device mounting screw, but prior to the action of tightening down of the wiring device mounting screw.
Figure 4:
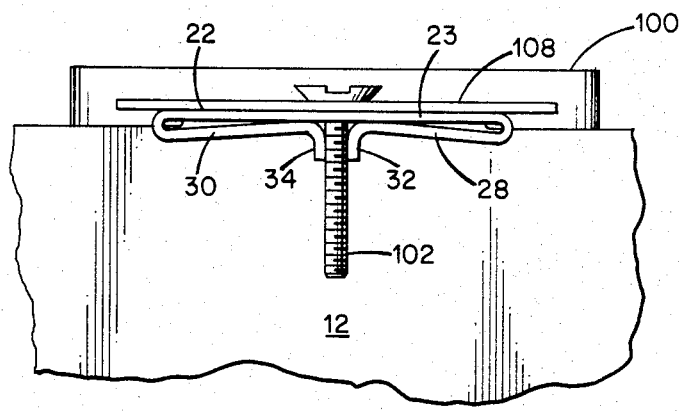
FIG. 4 is a partial end view of the wiring box of FIGS. 1, 2 and 3 shown following the action of tightening down the wiring device mounting screw.

The functioning of the screw engaging portions of the box endwall structure can be easily seen by referring to FIGS. 2, 3, and 4 in which the same numerals are used to designate corresponding elements. In FIG. 2 the structure of the screw engaging portion 23 of the box endwall 12 is shown prior to insertion of the wiring device mounting screw. Leg portions 28 and 30 are shown formed downwardly from flat portion 22 along box wall 12. In a preferred embodiment of the present invention, the leg portions 28 and 30 may be substantially flat, being bent downward along the wiring box endwall to form acute angles with the flat portion 22 as shown in FIG. 2. Alternatively, leg portions 28 and 30 may be folded to form curved leg portions having an S-shape or ogee curve. The foot portions 32 and 34 are spaced apart by the gap indicated by 29 which is slightly less than the diameter of mounting screw 102.

In FIG. 3 the view of the wiring box shows mounting screw 102 after insertion through the opening in flat portion 22 and between the opposed foot portions 32 and 34. Leg portions 28 and 30 have flexed apart from one another to permit the easy insertion of the mounting screw 102, but the resilience of the leg portions provides a restoring force which urges the opposed foot portions 32 and 34 toward one another, to abut the mounting screw 100.

In FIG. 3, there is shown the configuration of the screw engaging portion 22 of the box endwall 12 following the operation of tightening the mounting screw. Turning the mounting screw 102 of the wiring device initially causes the mounting screw to move further into the gap 29 between the opposed foot portions 32 and 34. As the head of the mounting screw 102 abuts the wiring device mounting strap 108 and encounters resistance, foot portions 32 and 34 are drawn upward toward the flat portion 22 until leg portions 28 and 30 finally contact the underside of flat portion 22. This action causes the foot portions 32 and 34 to be increasingly forced against the threads of the mounting screw 102, firmly engaging the screw. Moreover, when the leg portions 28 and 30 have been drawn up against the underside of the flat portion 22, no further motion of the leg portions is permitted, and any further attempt to tighten the screw increasingly forces the foot portions 32 and 34 against the threads of the mounting screw 102.

Wiring boxes in accordance with the present invention can be easily fabricated from a continuous metal strip and in a stamping press having multiple stations for the various forming and stamping operations. Steel coil strip is fed into one end of the stamping press and advances stepwise through the stations of the box formation with the stamping, punching, and forming operations taking place at each station, and with a fully formed box ejected with each stroke of the machine. Thus, wiring boxes in accordance with the present invention have integral one-piece structure, including a wiring device mounting means which permits easy and quick push insertion, of the fastening screws and firm mounting of the wiring device.

While there have been shown and described what are at present believed to be the preferred embodiments of the present invention, it will be clear to one skilled in the art to which this invention pertains that various changes and modifications may be made therein without departing from the scope of the invention as defined by the appended claims.

What is claimed is:

1. A resilient, sheet metal, electrical wiring box comprising: an integral metal wall structure having four side walls and a bottom wall, each side wall having side edges, and first and second end edges; the side walls joined together along their side edges, and the bottom wall joined to the side walls along the first end edges to form a chamber to receive a wiring device; two opposed side walls each having a wiring device attachment means integral therewith for receiving the threaded mounting member of a wiring device to be mounted in said box chamber; said wiring device attachment means comprising:

a rectangular base plate fixed along one long side to the second end edge of the side wall and extending at right angles to the side wall, said base plate having a first centrally located, mounting member receiving aperture slightly larger than the outside diameter of the mounting member of the wiring device but smaller than the head of the mounting member;

first and second, generally rectangular, resiliently-flexible, leg plates, the first leg plate joined at one narrow end to a first short side of the base plate, the second leg plate joined at one narrow end to the second short side of the base plate, the first and second leg plates extending down the outside of the sidewall to have their other narrow ends located adjacent each other and spaced below the first aperture in the base plate;

the first and second leg plates terminating in first and second opposed foot portions, said foot portions forming a second aperture through which said wiring device mounting member can be inserted, said foot portions provided with thread engaging means for contacting said mounting member;

said opposed leg plates adapted to flex apart to permit the facile insertion of the threaded mounting member between the opposed foot portions without turning, and adapted to urge the opposed foot portions toward one another to have the thread engaging means engage the mounting member, wherein the foot portions wedge themselves tightly against the mounting member when the mounting member is turned to have the leg plates contact the base plate.

2. An electrical wiring box in accordance with claim 1 wherein said first and second foot portions are spaced apart by a distance less than the outside diameter of said wiring device mounting member.

3. An electrical wiring box in accordance with claim 1 wherein said thread engaging means comprise embossed threads on said first and second foot portions.

* * * * *